J. H. EDMONDSON.
Road-Scrapers.
No. 196,143.     Patented Oct. 16, 1877.
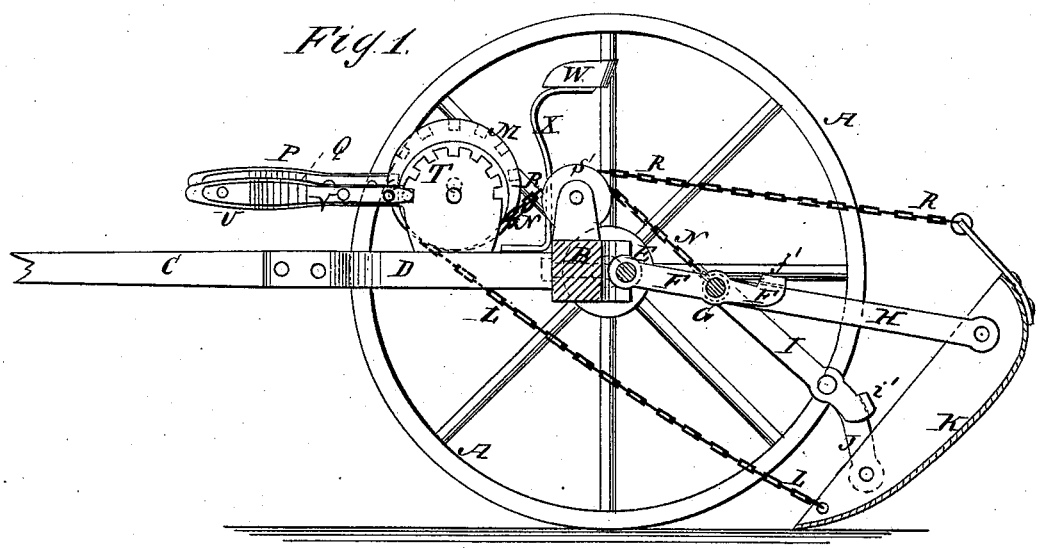
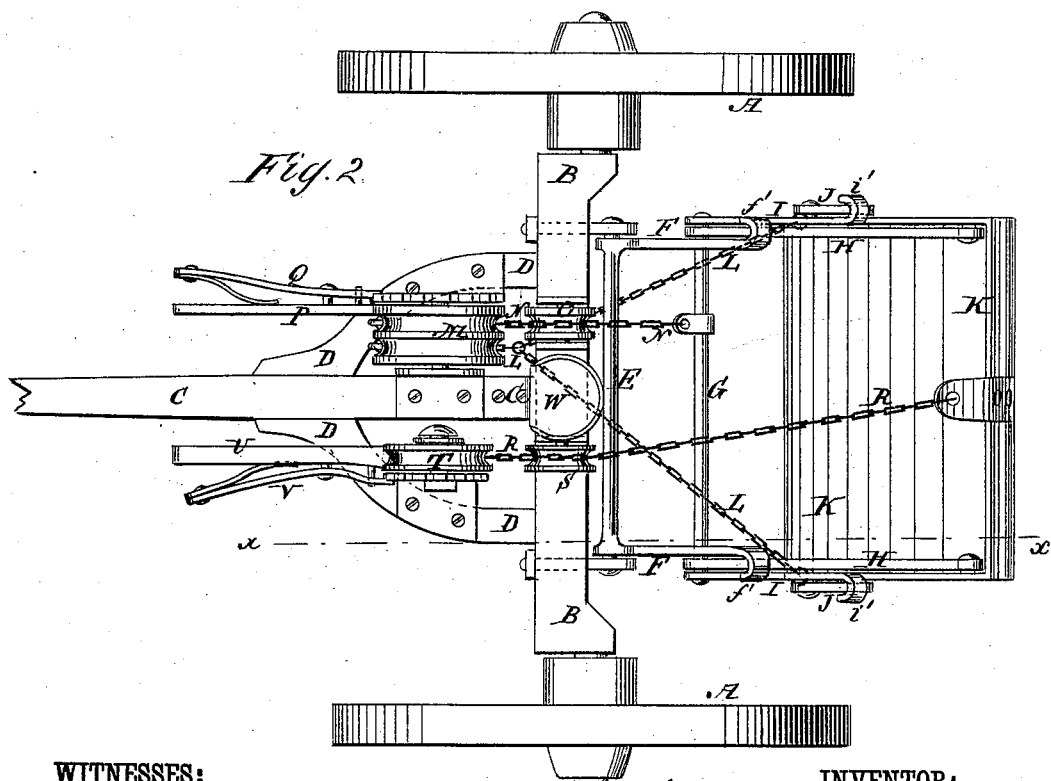
WITNESSES:
E. Wolff
J. H. Scarborough
INVENTOR:
J. H. Edmondson
BY Munn & Co
ATTORNEYS.

UNITED STATES PATENT OFFICE.

JAMES H. EDMONDSON, OF VALPARAISO, INDIANA.

IMPROVEMENT IN ROAD-SCRAPERS.

Specification forming part of Letters Patent No. 196,143, dated October 16, 1877; application filed August 24, 1877.

*To all whom it may concern:*

Be it known that I, JAMES H. EDMONDSON, D. D. S., of Valparaiso, in the county of Porter and State of Indiana, have invented a new and useful Improvement in Sulky Road-Scrapers, of which the following is a specification:

Figure 1 is a vertical section of my improved scraper, taken through the line $x\ x$, Fig. 2. Fig. 2 is a top view of the scraper.

Similar letters of reference indicate corresponding parts.

The object of this invention is to furnish an improved sulky road-scraper, which shall be so constructed that it may be easily operated by the driver from his seat to load and unload it, which, when loaded, may be swung beneath the axle and carried to any desired distance, and which shall be simple in construction, convenient in use, and effective in operation.

The invention consists in the shaft provided with arms having hooks upon their outer ends, the bars having hooks upon their lower ends, and the bars pivoted to the scraper, in combination with the axle and the said scraper; in the combination of the branched chain and the double pulley and its lever and spring-lever catch with the scraper, and its shafts, arms, and bars, and the axle; in the combination of the chain, the guide-pulley, and the double pulley and its lever, and spring-lever catch with the axle, with the shaft, and with the shaft-arms, and bars, and the scraper; and in the combination of the chain, the guide-pulley, and the pulley-lever, and spring-lever catch, with the scraper, and the shafts, arms, and bars, as hereinafter fully described.

A A are the wheels, which revolve upon the journals of the axle B. The axle B is made with a forward offset near the inner end of each journal, to bring the points of support nearer the axis, and thus balance the scraper more accurately.

To the forward side of the axle B is rigidly attached the tongue C, the connection being strengthened by the hounds D.

E is a shaft placed parallel with, and close to, the rear side of the axle B, and which works in eyebolts or other bearings attached to said axle.

To the shaft E, near its ends, are rigidly attached the inner ends of the arms F, to which, near their outer ends, are pivoted the ends of a shaft, G.

To each end of the shaft G is pivoted the upper ends of two bars, H I, and to the bars I, near their lower ends, are pivoted the upper ends of the short bars J, the lower ends of which are pivoted to the forward parts of the sides of the scraper K. The lower ends of the bars H are pivoted to the rear parts of the sides of the scraper K.

The projecting ends of the arms F and bars I have projecting hooks $f'\ i'$ formed upon them to strike against the rear sides of the bars I and J, respectively, and serve as stops to prevent the said bars I J from turning any farther back upon their pivots, and thus hold the scraper K to its work.

To the forward part of the sides of the scraper K are attached the ends of the branches of the chain L, the forward end of which passes around and is attached to one part of the double pulley M.

To the shaft G is attached the end of a chain, N, which passes over a guide-pulley, O, pivoted to the axle B, and its other end passes around and is secured to the other part of the double pulley M.

To the double pulley M is attached a lever, P, which is provided with a spring-lever catch, Q, engaging with notches or teeth formed in the curved upper edge of the support for the said pulley M, so as to lock the scraper in any position into which it may be adjusted.

The chains L and N are so adjusted that, when the pulley M is turned, the first effect is to raise the forward edge of the scraper K, and the second effect is to raise the scraper and swing it and its load beneath the axle B, so that it can be carried to any desired distance.

To the rear side of the scraper K, or to an arm rigidly attached to said rear side, is attached the end of a chain, R, which passes over a guide-pulley, S, pivoted to the top of the axle B. The other end of the chain R passes around, and is attached to a pulley, T, pivoted to supports attached to the hounds D, and provided with a lever, U. To the lever U is attached a spring-lever catch, V, which engages with notches or teeth formed in the edge of the support for the pulley T, so as to hold the scraper K at any desired inclination.

With this construction, when the loaded scraper has been drawn to the place of deposit, by operating the lever U the rear side of the scraper K will be raised, discharging the load. W is the driver's seat, the standard X of which is attached to the tongue C at the forward side of the axle B, so that the driver's weight may assist in balancing the weight of the scraper.

Having thus described my invention, I claim as new and desire to secure by Letters Patent—

1. The shaft E, provided with the arms F, having hooks $f'$ upon their outer ends, the shaft G, the bars I, having hooks $i'$ upon their lower ends, and the bars H J, in combination with the axle B and the scraper K, substantially as herein shown and described.

2. The combination of the branched chain L and the double pulley M, and its lever and spring-catch P Q, with the scraper K, and its shafts, arms, and bars E G F H I J, and the axle B, substantially as herein shown and described.

3. The combination of the chain N, guide-pulley O, and double pulley M, and its lever and spring-catch P Q, with the axle B, with the shaft G, and with the shaft E, arms F, bars H I J, and scraper K, substantially as herein shown and described.

4. The combination of the chain R, the guide-pulley S, and the pulley, lever, and spring-lever catch T U V, with the scraper K and the shafts, arms, and bars E G F H I J, substantially as herein shown and described.

JAMES HENRY EDMONDSON, D. D. S.

Witnesses:
D. A. KELLOGG,
A. W. KELLOGG.